M. D. WINCHELL.
CHALK LINE REEL.
APPLICATION FILED NOV. 1, 1915.
1,208,068.
Patented Dec. 12, 1916.
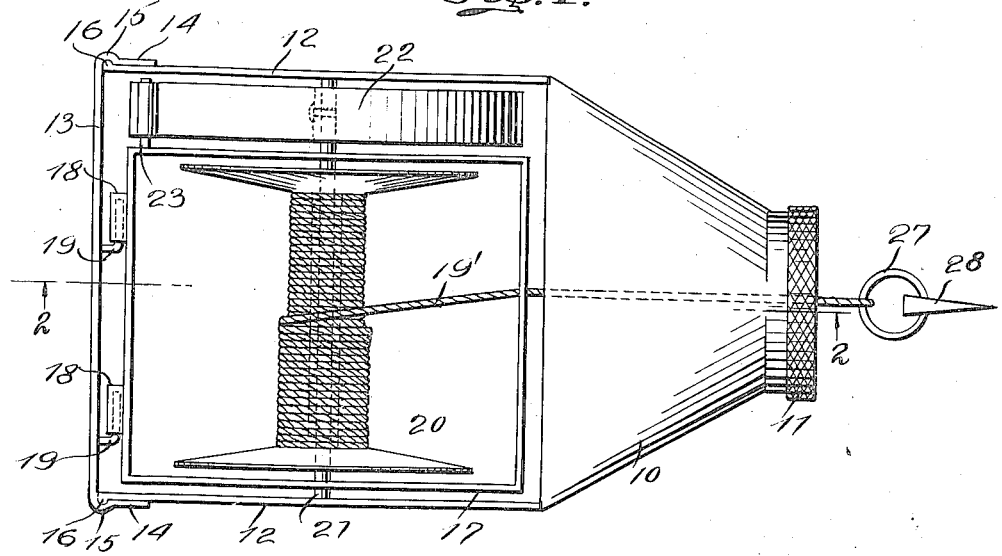
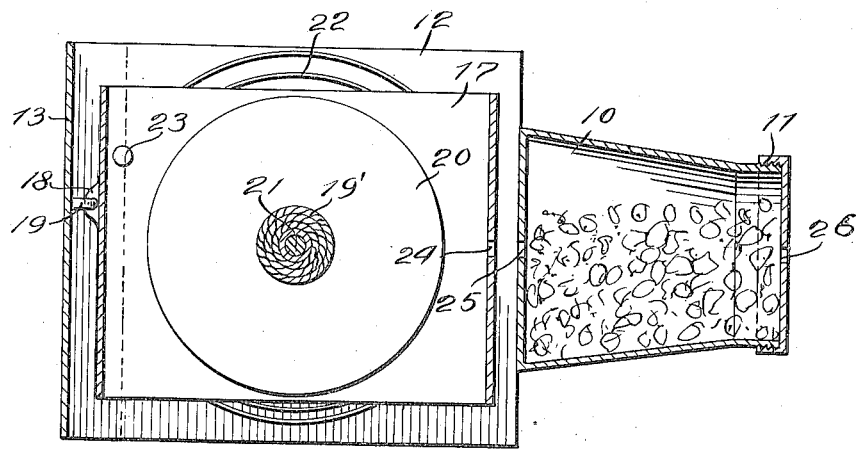
WITNESSES
Edw. S. Hall.
Ross J. Woodward.
INVENTOR
Milton D. Winchell.
BY Richard B. Owen.
ATTORNEY

UNITED STATES PATENT OFFICE.

MILTON D. WINCHELL, OF FLEISCHMANNS, NEW YORK.

CHALK-LINE REEL.

1,208,068.　　　　　Specification of Letters Patent.　　Patented Dec. 12, 1916.

Application filed November 1, 1915. Serial No. 59,103.

*To all whom it may concern:*

Be it known that I, MILTON D. WINCHELL, a citizen of the United States, residing at Fleischmanns, in the county of Delaware and State of New York, have invented certain new and useful Improvements in Chalk-Line Reels, of which the following is a specification.

This invention relates to an improved reel for holding a chalk line and the principal object of the invention is to provide an improved frame for the chalk reel, the frame being so constructed as to provide a receptacle for containing chalk, the line passing through the receptacle and becoming covered with chalk when drawn out.

Another object of the invention is to so construct this frame that the reel may be provided with a spring for winding the line upon the reel.

Another object of the invention is to so construct this device that the main frame and auxiliary frame may be formed of sheet metal and thus very cheaply produced.

This invention is illustrated in the accompanying drawings, wherein:—

Figure 1 is a view showing the improved device in plan, Fig. 2 is a longitudinal sectional view through the device taken along the line 2—2 of Fig. 1.

The main frame includes the housing or receptacle 10 which is provided with a removable cover 11, the side walls 12 and the rear wall 13 which is provided with flanges 14 extending along the side walls 12 a short distance and provided with pockets 15 to receive the enlargements 16 of the side walls. The flanges 14 and side walls 12 have sufficient resiliency to caues a binding action releasably holding the rear wall in engagement with the side walls. The cover 11 is provided so that the powdered chalk shown in Fig. 2 can be very easily placed in the receptacle.

The inner frame or auxiliary frame 17 is positioned within the main frame and is provided with the extensions 18 engaged by the pins 19 carried by the rear wall 13 to hold the auxiliary frame in the proper position and prevent the auxiliary frame from rotating when the line 19' is wound or unwound from the drum 20. This drum 20 is positioned within the frame and is rigidly mounted upon the axle 21 extending through the auxiliary frame and rotatably mounted in the walls 12 of the main frame. A spring 22 has its inner end connected with the axle 21 and its outer end connected with a pin 23 carried by the auxiliary frame. As the line is unwound from the spool or drum 20 the spring 22 will be wound and thus when the line is released the spring will rotate the drum to wind the line upon the drum. This line 19' extends through openings 24, 25 and 26 as shown in Fig. 2 and is provided with a ring 27 and a staple 28 shown in Fig. 1 so that the free end of the line may be connected with a suitable holding by driving the staple into the same. As the line is unwound it passes through the chalk in the receptacle 10 and thus will become coated with chalk. It was stated that powdered chalk was placed in the receptacle but it is obvious that any other suitable material which could be taken up by the line could be placed in the receptacle and that this could be either in a powdered form, lump form or in any other suitable condition. If it is desired to remove the inner frame for any reason this can be easily done by removing the rear wall 13 of the outer frame thus releasing the side walls and permitting them to spring apart and release the axle 21. Any necessary repair can then be made and the device then again assembled.

What is claimed is:—

1. A device of the character described comprising an outer frame forming a chalk receptacle, side walls extending from said receptacle and having their free end portions provided with lugs, a rear wall provided with side flanges extending along the outer faces of said side walls and provided with pockets to receive the lugs and releasably hold the rear wall in engagement with the side walls, an inner frame positioned within the outer frame, an axle passing through said inner frame and journaled in the outer frame, a drum carried by said axle within said inner frame, a line wound upon said drum and extending through said receptacle, means for rotating said axle for winding the line upon the drum, extensions provided upon said inner frame, and pins extending from said rear wall and engaging said extensions to hold said inner frame against rotation.

2. A device of the character described comprising an outer frame forming a chalk receptacle, an inner frame positioned within said outer frame, an axle extending through said inner frame and journaled in said outer frame, a drum mounted upon said axle within said inner frame, means for rotating said axle for winding a line upon said drum, extensions formed upon said inner frame, and means extending from said outer frame for engaging said extensions to hold the inner frame against rotation.

In testimony whereof I affix my signature in presence of two witnesses.

MILTON D. WINCHELL.

Witnesses:
　CLARENCE WILSON,
　DURWARD B. KELLY.